United States Patent [19]
McArthur

[11] Patent Number: 5,805,806
[45] Date of Patent: Sep. 8, 1998

[54] METHOD AND APPARATUS FOR PROVIDING INTERACTIVE NETWORKING BETWEEN TELEVISIONS AND PERSONAL COMPUTERS

[75] Inventor: Kelly M. McArthur, Portland, Oreg.

[73] Assignee: Intel Corporation, Santa Clara, Calif.

[21] Appl. No.: 574,401

[22] Filed: Dec. 18, 1995

[51] Int. Cl.$^6$ ................................................. G06F 13/00
[52] U.S. Cl. ................................. 395/200.8; 395/200.49
[58] Field of Search .............................. 395/800, 200.49, 395/200.59, 200.79, 200.8

[56] References Cited

U.S. PATENT DOCUMENTS

| | | | |
|---|---|---|---|
| 4,885,747 | 12/1989 | Foglia | 370/123 |
| 5,365,264 | 11/1994 | Inoue | 348/10 |
| 5,499,047 | 3/1996 | Terry | 348/6 |
| 5,565,910 | 10/1996 | Rowse | 398/15 |

OTHER PUBLICATIONS

Foster, R.S., CA TV Systems are Evolving to Support a Wide Range of Services (Delivering Voice and Other Services Over Cable Television Systems) Telecommunications, Jan. 1994 pp. 95(3), vol. 28, No. 1.

IEEE Std. 802.7–1989, Recommended Practices for Boardband Local Area Networks, Jan. 1992; 85 pages.

*Primary Examiner*—Eric Coleman
*Attorney, Agent, or Firm*—Blakely, Sokoloff, Taylor & Zafman

[57] ABSTRACT

A local area network (LAN) supports both baseband digital LAN signals and video, including television signals originating outside the network and local video generated within the network. The network may include personal computers, television receivers, video cassette recorders, printers, and video cameras. Connection circuitry permits each device to receive both the video and the digital LAN signals through a single coaxial cable connection. The connection circuitry includes a LAN transceiver for each device in the network to enable each device to transmit, receive, and decode digital LAN signals. A computer interface enables any personal computer in the network to receive and display television signals received by the network and video generated by another computer or other device. A television interface enables any television in the network to receive and display local video output by a personal computer or other device in the network and enables the television to be used as a remote monitor for the computer.

12 Claims, 13 Drawing Sheets

METHOD AND APPARATUS FOR PROVIDING INTERACTIVE NETWORKING BETWEEN TELEVISIONS AND PERSONAL COMPUTERS

FIELD OF THE INVENTION

The present invention pertains to the field of computer networks. More particularly, the present invention relates to a local area computer network capable of supporting both baseband digital communication and video, including television signals originating from outside the network and local video generated within the network.

BACKGROUND OF THE INVENTION

As a result of advances in both computer and television technologies, a partial merging of these technologies has occurred. For example, many new personal computers (PCs) provide capability to receive broadcast or cable television signals. In addition, it is expected that PCs will soon commonly provide capability to output video in National Television System Committee (NTSC) format. Similarly, television technology is also becoming more sophisticated, with cable television companies now providing various "interactive" capabilities to their subscribers. Institute of Electrical and Electronics Engineers (IEEE) standard 802.7 describes how digital signaling and cable television signals may coexist on a single cable between the cable television company and the subscriber's home to provide such capabilities.

With such advances in television and computer technology, a "seamless", interactive interface between a television and a personal computer in the home environment becomes an attractive prospect. In particular, it would be desirable to have an interface by which an ordinary television could function as a remote display device for a home personal computer while the computer could receive and display television programs using the home's existing cable television cabling. One reason that such an interface is desirable is the growing interest in the World Wide Web along with the increasingly more sophisticated web browsers and other interactive entertainment and educational applications that are becoming available. Existing technologies, however, have certain disadvantages which make such an interface difficult, if not impossible, to implement. For example, there is currently no efficient way for a PC to communicate with remote devices such as televisions in other rooms. In addition, interactive television requires "set-top" decoder boxes to decode the various different signals. Such boxes often interfere with a consumer's ability to record one television program while watching another and are largely redundant to the processing power that already exists in a PC. This redundancy will become increasingly more pronounced as set-top boxes incorporate more sophisticated digital-video decoders and mass-storage devices for applications such as "movie-on-demand" delivery.

It would also be desirable to provide a network for two or more PCs in the home which includes capability to distribute and display locally-generated video on any display device in the network. A common way to deliver video from a remote video source to a television receiver within the home environment is to use a low-power wireless transmitter. However, such devices tend to be limited to a single television channel and provide no capability to transmit signals back to the source. On the other hand, existing systems that distribute video throughout the home provide no effective support for PC networks, which tend to require separate cabling and interface cards.

Hence, what is desired is a way to implement a seamless interface between PCs and televisions in the home environment. In particular, what is needed is a way to implement such an interface in the form of a home PC network that includes capability to utilize a television as a display device for any PC in the network and to use any PC in the network to receive and display cable television programs provided to the home. It is further desirable that such a network include capability to distribute video generated by a PC or other local video source in the network to any other PC or television in the network.

SUMMARY OF THE INVENTION

One aspect of the present invention is an interface device for interfacing a computer with a network capable of supporting baseband digital signals and video signals. The interface device comprises connection means for coupling the interface device to the network; filter means for separating the baseband digital signals from the video signals; tuner means for demodulating video signals received from the network, and for providing demodulated video signals to the computer; modulation means for receiving, modulating, and transmitting video signals generated by the computer to the network; and transceiver means for transmitting baseband digital signals generated by the computer onto the network, and for coupling baseband digital signals received from the network to the computer.

Another aspect of the present invention is an interface device for coupling a television receiver to a network capable of supporting baseband digital signals and video signals. The interface device comprises first means for coupling the baseband digital signals and the video signals between the interface device and the network; second means for separating the baseband digital signals from the video signals, such that only the video signals are coupled to the television receiver; third means for receiving input from a computer peripheral component; and fourth means for transmitting baseband digital signals onto the network based on the input from the computer peripheral component and for receiving baseband digital signals from the network.

Another aspect of the present invention is a network supporting a plurality of types of signals. The network comprises a personal computer and a television receiver. The personal computer is capable of outputting and receiving video and capable of displaying images in response to the video. The network also comprises connection means for providing video and baseband digital information to the personal computer and to the television receiver over the same transmission medium. The video includes television signals received by the network. The connection means is also for receiving television signals from outside the network and for providing the television signals to the television receiver and the personal computer. In addition, the connection means is for enabling the television receiver to receive and decode baseband digital signals and video output by the personal computer.

Another aspect of the present invention is a method of allocating frequency usage in a local area computer network that includes a personal computer capable of receiving and transmitting video and a television receiver. The network includes a transmission line for supporting television signals received by the network, baseband digital information generated by the personal computer, and local video generated by the computer. A first frequency band is allocated for communication over the transmission line of the digital information, such that the television receiver can receive baseband digital information transmitted over the network by the personal computer. A second frequency band is allocated for communication over the transmission line of television signals on a plurality of television channels. The second frequency band has a lower limit higher than the upper limit of the first frequency band. A third frequency band is allocated for communication over the transmission line of the local video on any of a plurality of local video channels. The third frequency band consists of a plurality of frequencies higher than all frequencies within the second frequency band.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
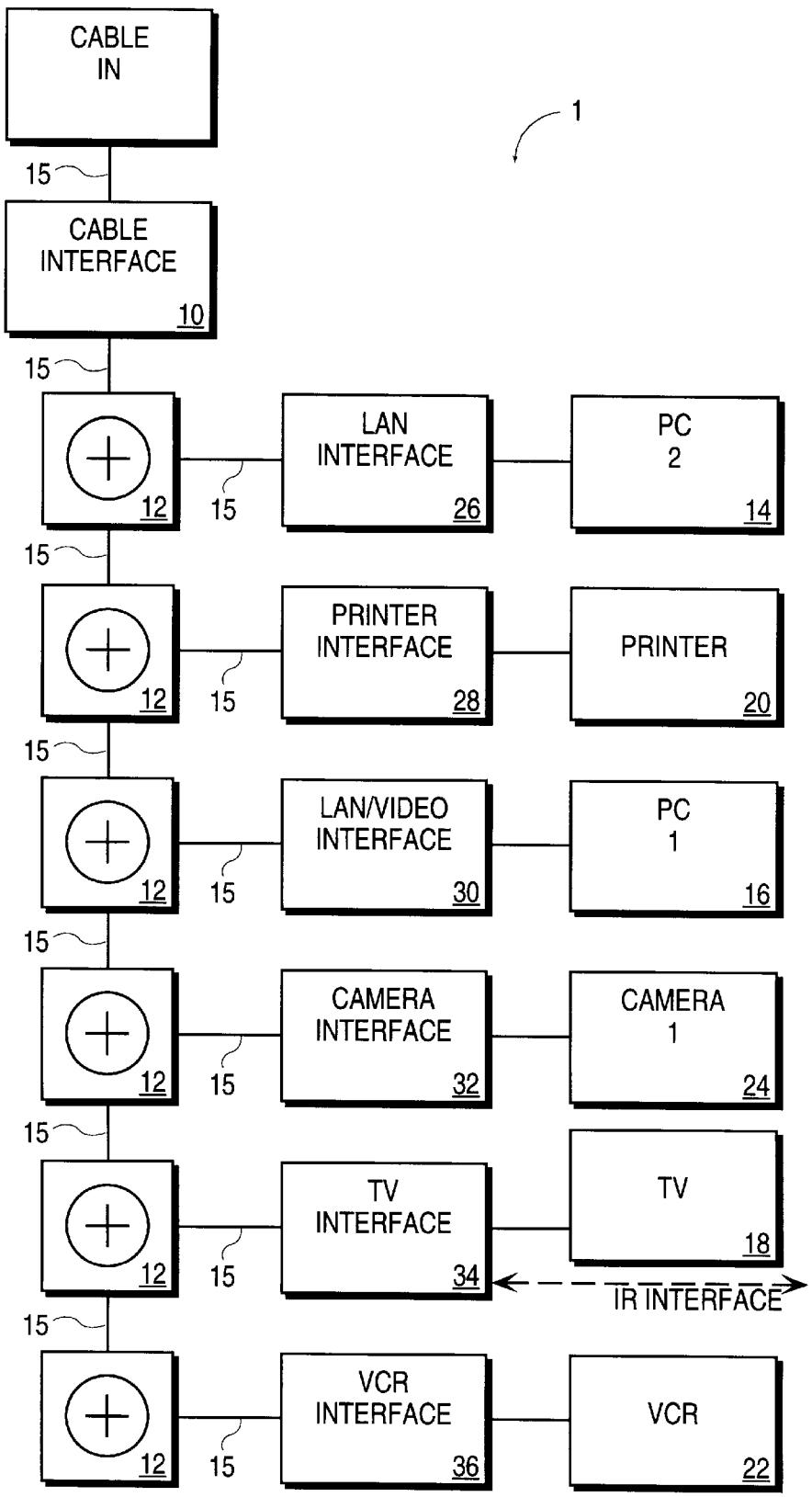
FIG. 1 illustrates a local area network according to the present invention having a daisy-chain configuration.

An apparatus and method are described for providing interactive capabilities between televisions and personal computers (PCs) in a local area network in the home environment. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

The present invention provides a way to implement a local area network (LAN) for PCs and televisions in the home environment which can make use of the home's existing cable television cable infrastructure. In addition to supporting file and printer sharing between PCs, the network permits a television to be used as a display device for any PC in the network and permits any PC in the network to receive and display cable television programs provided to the home. The network also includes capability to distribute video generated by any PC or other video source in the network to any other PC or television in the network. The network further allows for easy expansion through the addition of peripheral devices to the network, such as wireless RF transmitters.

Table 1 shows the frequency allocation scheme used in the present invention. Cable television services generally occupy a range of frequencies from 50 to 800 MHz. Consequently, the frequency range from 0 to 50 MHz is generally available for other purposes. In accordance with the present invention, the range of frequencies from 0 to 50 MHz is used for a local baseband (unmodulated) digital network in the home. The baseband digital network supports file and printer sharing between two or more PCs, as will be described below. The available bandwidth can support a direct digital transmission rate of up to approximately 10 Mbps, or approximately 1 million bytes per second. The frequency band from 50 to 750 MHz is used for standard cable television signals. The frequency band from 750 to 800 MHz is used for remodulated, local video originating from PCs or other devices in the network.

TABLE 1

| Frequency | Allocation |
| --- | --- |
| 750–800 MHz | Local Video Channels SN1–SN8 |
| 50–750 MHz | Cable Channels CC1–CC116 |
| 0–50 MHz | Baseband Digital Network @ 1 MB/s |

In the preferred embodiment, a frequency-shift keying (FSK) encoding scheme is utilized for the baseband digital information; however, other encoding schemes are possible. For example, quadrature amplitude modulation (QAM) or a simple one volt peak-to-peak digital signal are possible alternatives to FSK.

In addition to PCs being able to generate video in the network, other video sources such as remote cameras can be connected to the network via LAN agents that have programmable modulators. A PC can thereby map the input from a camera or other device onto upper cable television channels that can be tuned by network televisions or PCs, as described below. Televisions in the network can directly tune in video in National Television System Committee (NTSC) format originating from a PC or remodulated video originating from any other device in the network.

The present frequency allocation scheme sacrifices several of the highest cable television channels in favor of local video. However, very few cable television systems currently use these higher channels, and if these channels are used, they tend to be allocated for program material which is of minimal interest to many customers. Therefore, in the preferred embodiment, the frequency range from 750 to 800 MHz is used to implement eight local video channels. It should be appreciated, however, that this number of local video channels is essentially arbitrary and that a larger number or smaller number of local video channels can be implemented if desired. It should be appreciated that a smaller number of local video channels will permit a larger number of cable television channels to be received by devices in the network.

As shown in Table 2, the eight local video channels occupy the highest eight cable television channels, i.e., channel 118 through channel 125. Channel 117, which corresponds to frequency of 750 MHz, is assumed to be unavailable in order to provide adequate frequency margin for rolloff associated with filter components, which are described below. The eight local video channels are SN 1 through SN 8, which are mapped onto cable television channels 118 through 125.

TABLE 2

Cable TV Channel Assignments

| Channel | CC# | LAN | Frequency | MHz |
|---|---|---|---|---|
| 1 | 1 | | 72 | MHz |
| 2 | 2 | | 54 | MHz |
| 3 | 3 | | 60 | MHz |
| 4 | 4 | | 66 | MHz |
| 5 | 5 | | 76 | MHz |
| 6 | 6 | | 82 | MHz |
| A-5 | 95 | | 90 | MHz |
| A-4 | 96 | | 96 | MHz |
| A-3 | 97 | | 102 | MHz |
| A-2 | 98 | | 108 | MHz |
| A-1 | 99 | | 114 | MHz |
| A | 14 | | 120 | MHz |
| B | 15 | | 126 | MHz |
| C | 16 | | 132 | MHz |
| D | 17 | | 138 | MHz |
| E | 18 | | 144 | MHz |
| F | 19 | | 150 | MHz |
| G | 20 | | 156 | MHz |
| ... | ... | | ... | ... |
| 117 | 117 | | 750 | MHz |
| 118 | 118 | SN1 | 756 | MHz |
| 119 | 119 | SN2 | 762 | MHz |
| 120 | 120 | SN3 | 768 | MHz |
| 121 | 121 | SN4 | 774 | MHz |
| 122 | 122 | SN5 | 780 | MHz |
| 123 | 123 | SN6 | 786 | MHz |
| 124 | 124 | SN7 | 792 | MHz |
| 125 | 125 | SN8 | 798 | MHz |

Although the preferred embodiment makes use of cable television signals, it should be appreciate that television signals received by other means may also be utilized within the scope of the present invention. For example, television signals entering the home from a roof antenna or a community antenna can also be utilized.

FIG. 1 shows a network 1 (i.e., a LAN) for use in the home in accordance with the present invention. Although the preferred embodiment is directed to a network for the home environment, it should be appreciated that the present invention can also be implemented in various other environments, such as in a place of business. The network 1 includes a number of "nodes", including two PCs 14 and 16, a television 18, a printer 20, a video cassette recorder (VCR) 22, and a video camera 24 capable of generating NTSC video. As will become apparent from the description which follows, the network 1 may easily be expanded to accommodated additional nodes. In addition to the network nodes, the network 1 includes coaxial cabling and a number of components which provide various connection and interfacing functions in order to implement the frequency allocation scheme described above. These additional components include a cable interface 10, a LAN interface 26, a LAN/video interface 30, a printer interface 28, a camera interface 32, a TV interface 34, and a VCR interface 36, and several RF tap/summing junctions 12.

The RF tap/summing junctions 12 (hereinafter "RF taps 12") are connected by coaxial cable 15 in a daisy chain configuration. One of the RF taps 12 is coupled by coaxial cable 15 to an output of cable interface 10. An input of cable interface 10 is coupled by coaxial cable 15 to the home's cable television jack 8. Each RF tap 12 provides means for passing radio frequency (RF) and baseband data bi-directionally long the daisy chain while also providing a bi-directional tap through which a node can transmit or receive signals over the network 1. Specifically, each node of the network 1 is coupled to one of the interface devices 26, 28, 30, 32, 34, or 36, and each of the interface devices 26, 28, 30, 32, 34, and 36 is coupled by coaxial cable 15 to one of the RF taps 12.

For purposes of this description, it is assumed that PC 16 has the capability to output NTSC video, while PC 14 does not have such capability. Therefore, PC 16 is interfaced with the network 1 via LAN/video interface 30, which includes components that provide a video interface with the network 1. PC 14 is interfaced with the network 1 via LAN interface 26, which does not include a video interface. Similarly, television 18 is coupled to an RF tap 12 through TV interface 24; VCR 22 is coupled to an RF tap 12 through VCR interface 26; printer 20 is coupled to an RF tap 12 through printer interface 28; and, camera 24 is coupled to an RF tap 12 through camera interface 32.

Figure 2:
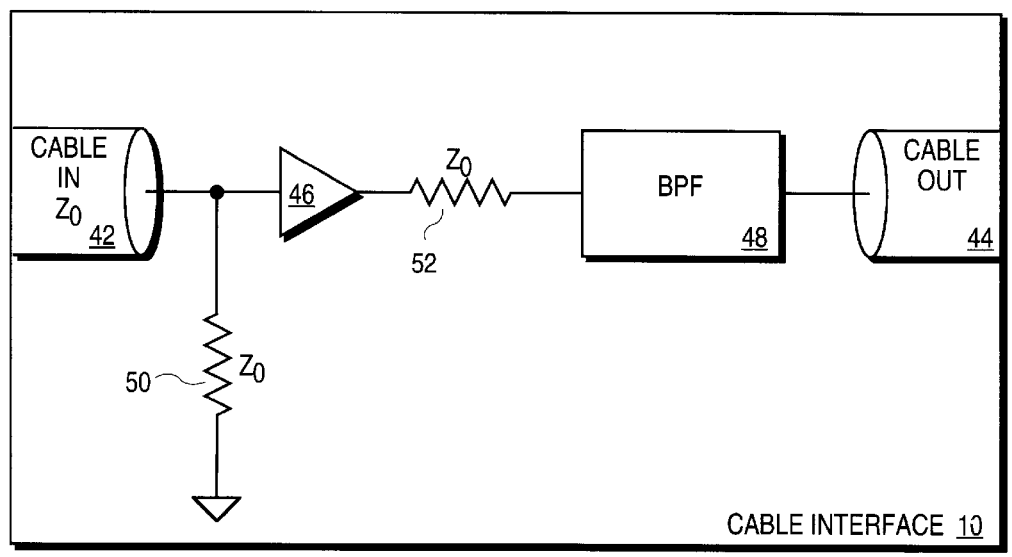
FIG. 2 illustrates a cable television interface to provide cable television signals to a network according to the present invention.

FIG. 2 shows cable interface 10 in detail. Cable interface 10 has a coaxial input connector 42 for receiving cable television signals and a coaxial output connector 44 for providing the cable television signals to the rest of the network 1. For purposes of this description, all coaxial cabling 15 in the network 1 is assumed to have a characteristic impedance $Z_o$. Coupled in series between input connector 42 and output connector 44 are a buffer/amplifier 46, a resistor 52 coupled to the output of the buffer amplifier 46, and a band-pass filter 48. Buffer amplifier 46 is a broadband amplifier having a gain of two, a bandwidth of at least 800 MHz, a high input impedance (e.g., greater than 10 Ω), and a low input impedance (e.g., less than 1 Ω) relative to the characteristic impedance $Z_o$ of the cabling 15. Band-pass filter 48 allows frequencies from 50 to 750 MHz to pass while filtering out other frequencies. Consequently, band-pass filter 48 allows cable television signals to enter the network 1 while preventing the low frequency baseband digital signals and the high frequency local video signals from leaving the network. Resistor 50 is coupled between the input of buffer/amplifier 46 and ground. Resistors 50 and 52 each have a value of $Z_o$ to provide appropriate impedance matching and termination.

Figure 3:
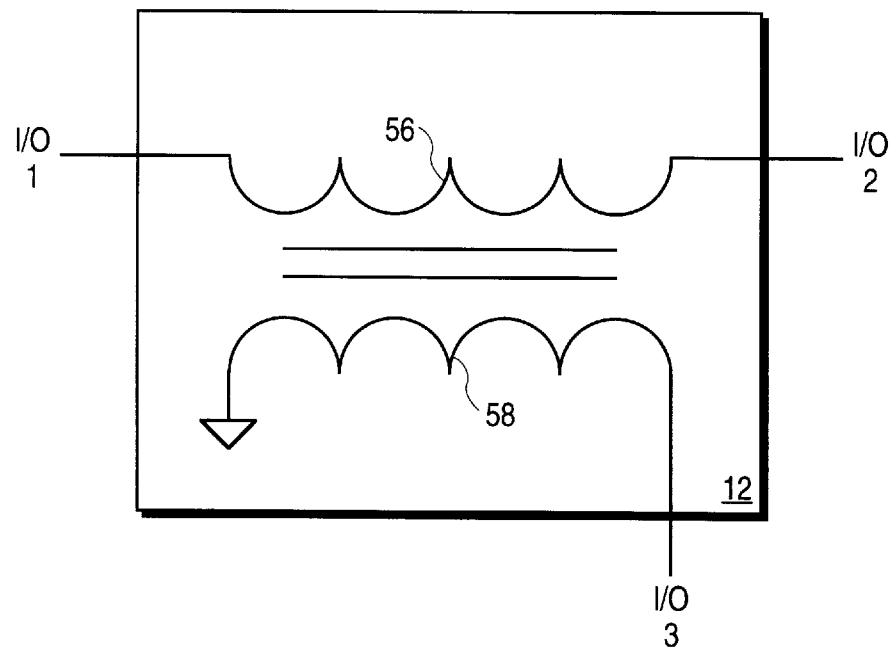
FIG. 3 illustrates an RF tap/summing junction for connecting devices in a network having a daisy-chain configuration.

FIG. 3 shows a RF tap 12 in detail. An RF tap 12 can be implemented with passive components in the form of a common mode transformer, including a primary coil 56 and a secondary coil 58. A network node is coupled to one terminal of the secondary coil 58 (through one of the interface devices 26, 28, 30, 32, 34, and 36), while the other terminal of the secondary coil 58 is grounded. The two terminals of the primary coil 56 each provide a connection point to the rest of the network 1. Connection to the terminals of primary coil 56 and secondary coil 58 is by coaxial connectors (not shown). It should be appreciated that, if passive components are used to implement the RF taps 12, a certain amount of insertion loss will result, causing the number of RF taps which can be placed in the network to be limited. However, with careful design, the insertion loss can be easily limited to an acceptable amount. Assuming an insertion loss of 3 dB per RF tap and an acceptable signal-to-noise ratio (SNR) of 50 dB for the tuner components (described below), the network 1 may support approximately 15 to 20 devices.

Figure 4:
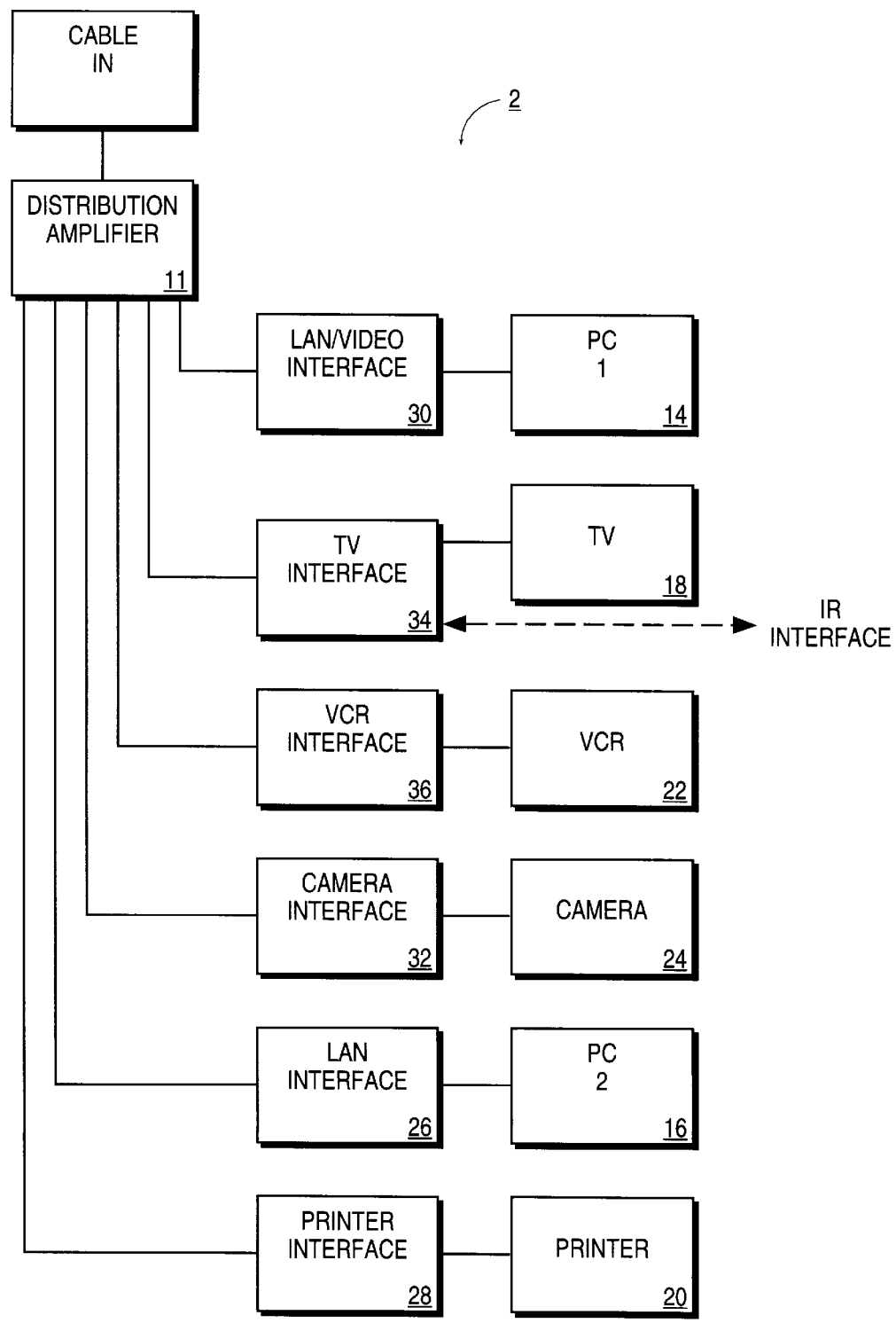
FIG. 4 illustrates a local area network according to the present invention having a hub configuration.

FIG. 4 illustrates a network (LAN) 2 according to an alternative embodiment of the present invention. Rather than a daisy chain configuration, network 2 has a hub architecture. As a result, network 2 does not make use of RF taps 12 or cable interface 10. The network nodes are coupled through their respective interface devices to a distribution amplifier, or hub, 11 which receives and redistributes the baseband digital signals, cable television signals, and local video signals.

Figure 5:
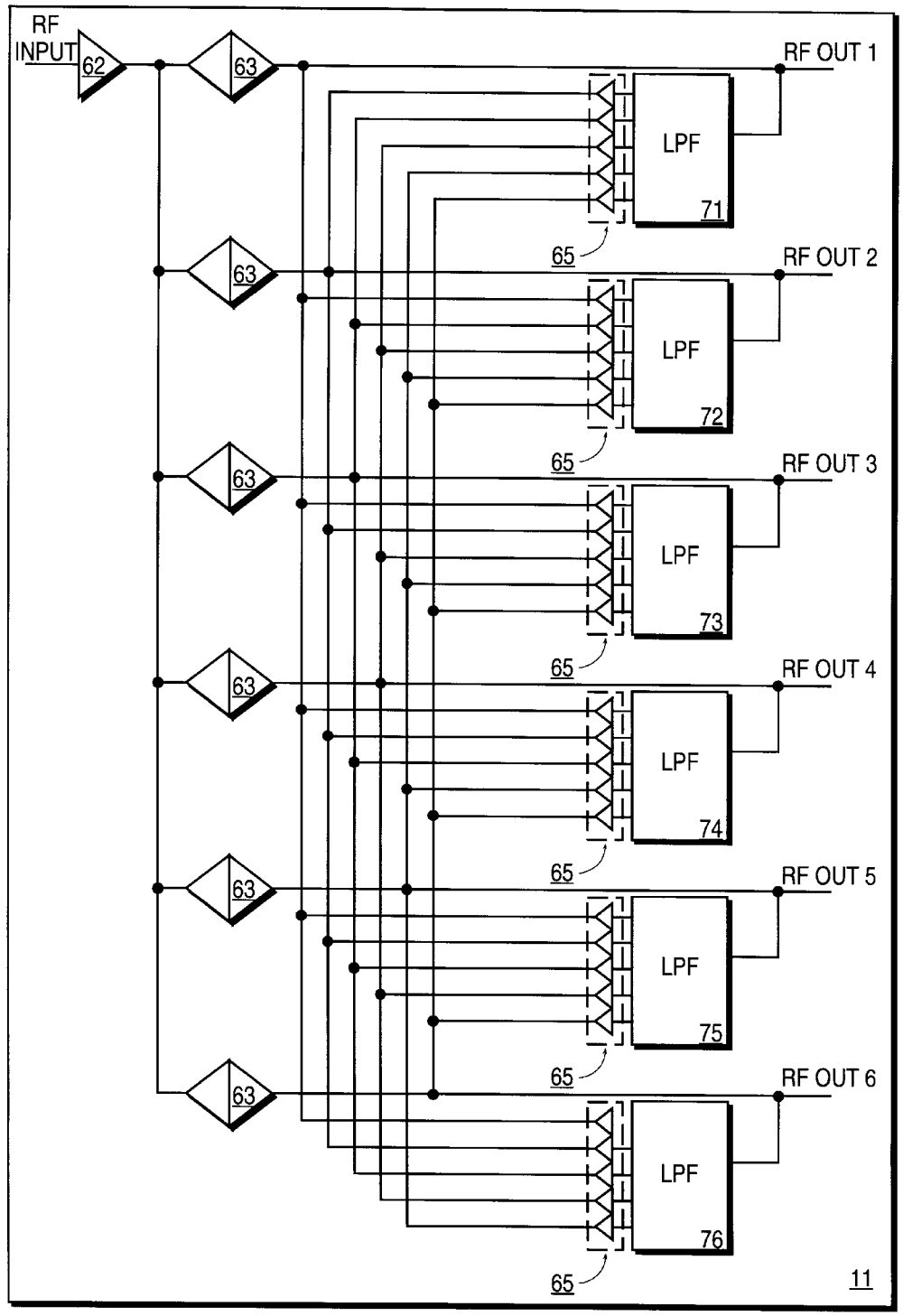
FIG. 5 illustrates a distribution hub for distributing cable television, local video, and baseband digital signals throughout a local area network.

FIG. 5 shows the distribution amplifier 11 in detail. The distribution amplifier 11 has an input RF INPUT which receives cable television signals from the cable television jack 8 through coaxial cable 15. In addition, six RF outputs, RF OUT 1 through RF OUT 6, are provided, one for each of the network nodes. Cable television signals entering the RF input are passed through a buffer/amplifier 62 and then distributed to an output path corresponding to one of the RF outputs. Upon entering one of the output paths, cable television signals pass through one of several RF back-channel buffers 63; one RF back-channel buffer 63 is provided for each of the output paths. After passing through a back-channel amplifier 63, the cable television signals are distributed to the rest of the network via one of the RF outputs.

The RF outputs are bidirectional, in that each of RF OUT 1 through RF OUT 6 also serves as an input to the distribution amplifier 11 for the low frequency baseband digital signals and local video signals. Low-pass filters 71 through 76 are coupled to RF OUT 1 through RF OUT 6, respectively, to extract the baseband digital signals.

Each of the low-pass filters 71 through 76 has one input and six outputs. The input of each LPF 71 through 76 is coupled to one of the RF outputs. The six outputs of each low-pass filter 71 through 76 are each coupled to a separate buffer/amplifier 65 for driving the baseband digital signals back onto the other five RF outputs.

RF back-channel buffers 63 allow frequencies from 50 to 750 MHz to pass in the direction from the RF INPUT toward the RF outputs, while allowing only frequencies over 750 MHz to pass in the direction from the RF outputs toward the RF input. As a result, local video received on one of the RF outputs is passed through one RF backchannel buffer 63 and then distributed to each of the other RF outputs through the other RF back-channel buffers 63. Buffer/amplifier 62 has essentially the same electrical characteristics as buffer/amplifier 46 (see FIG. 2). Each of the buffer/amplifiers 65 is an open collector, tristate driver. The distribution amplifier 11 is bandwidth limited to prevent noise from being driven onto the network on higher frequencies where no channel is present. Consequently, a network node with a modulator will be able to drive a signal out onto the network without interference from the distribution amplifier 11.

Figure 6:
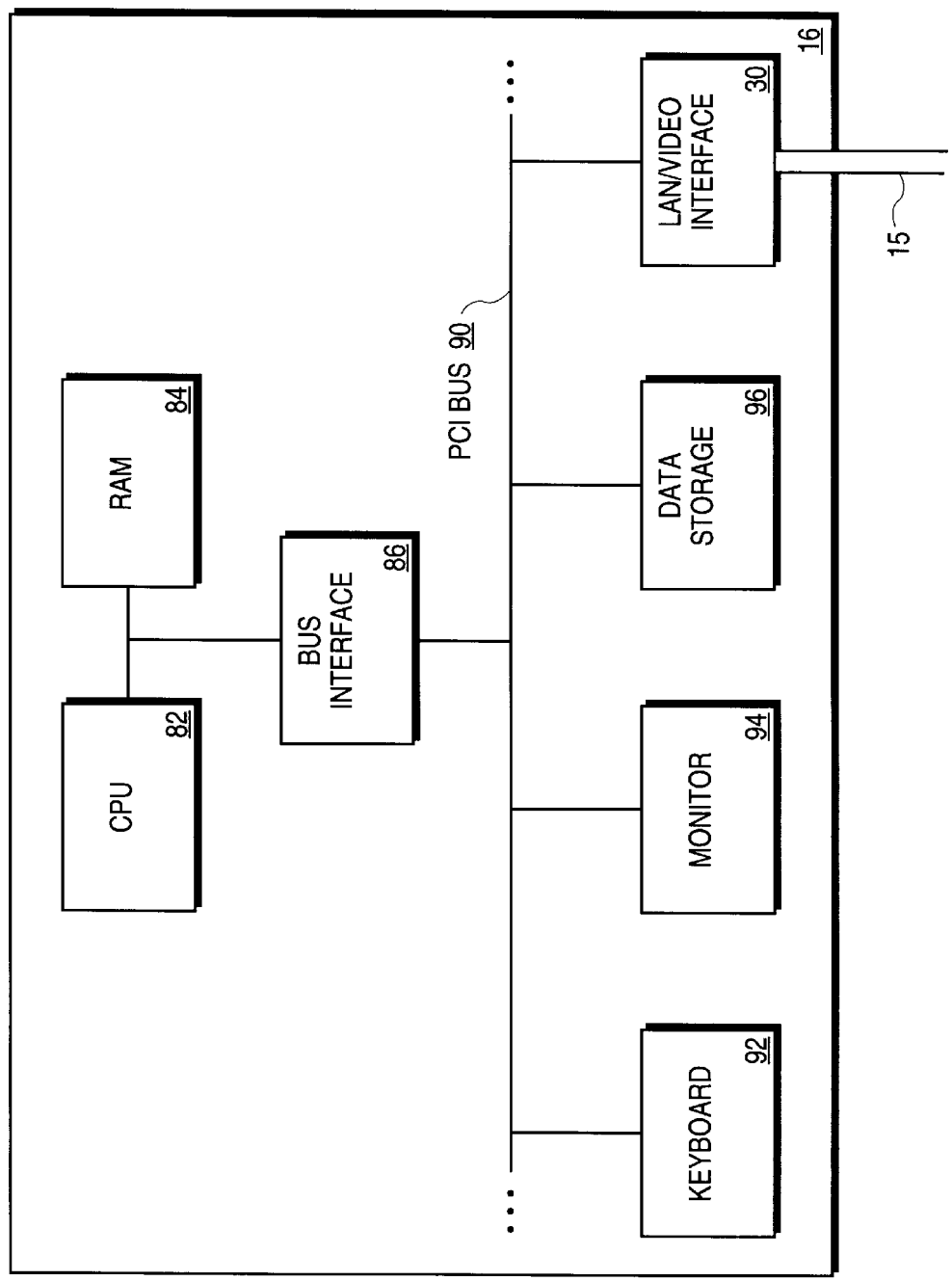
FIG. 6 is a block diagram of a personal computer including a LAN/video interface.

As described above, PC 14 and PC 16 are coupled to the network by LAN interface 26 and LAN/video interface 30, respectively. Although FIG. 1 shows LAN interface 26 and LAN video interface 30 as being separate from PC 14 and PC 16, either of these interface devices may instead be included within the PCs as add-in cards. For example, FIG. 6 shows a block diagram of PC 16 for such an embodiment. PC 16 includes a central processing unit (CPU) 82 coupled to random access memory (RAM) 84 through a system bus 88. The CPU 82 and RAM 84 are coupled to a peripheral component interconnect (PCI) bus 90 through a bus interface 86. Coupled to the PCI bus 90 are a video card (not shown), a keyboard 92, a monitor 94, a data storage device (e.g., disk drive or CD-ROM) 96, and LAN/video interface 30. PC 14 has essentially the same architecture as PC 16, except that PC 14 does not include a video card, and LAN interface 26 would take the place of LAN/video interface 30.

Figure 7:
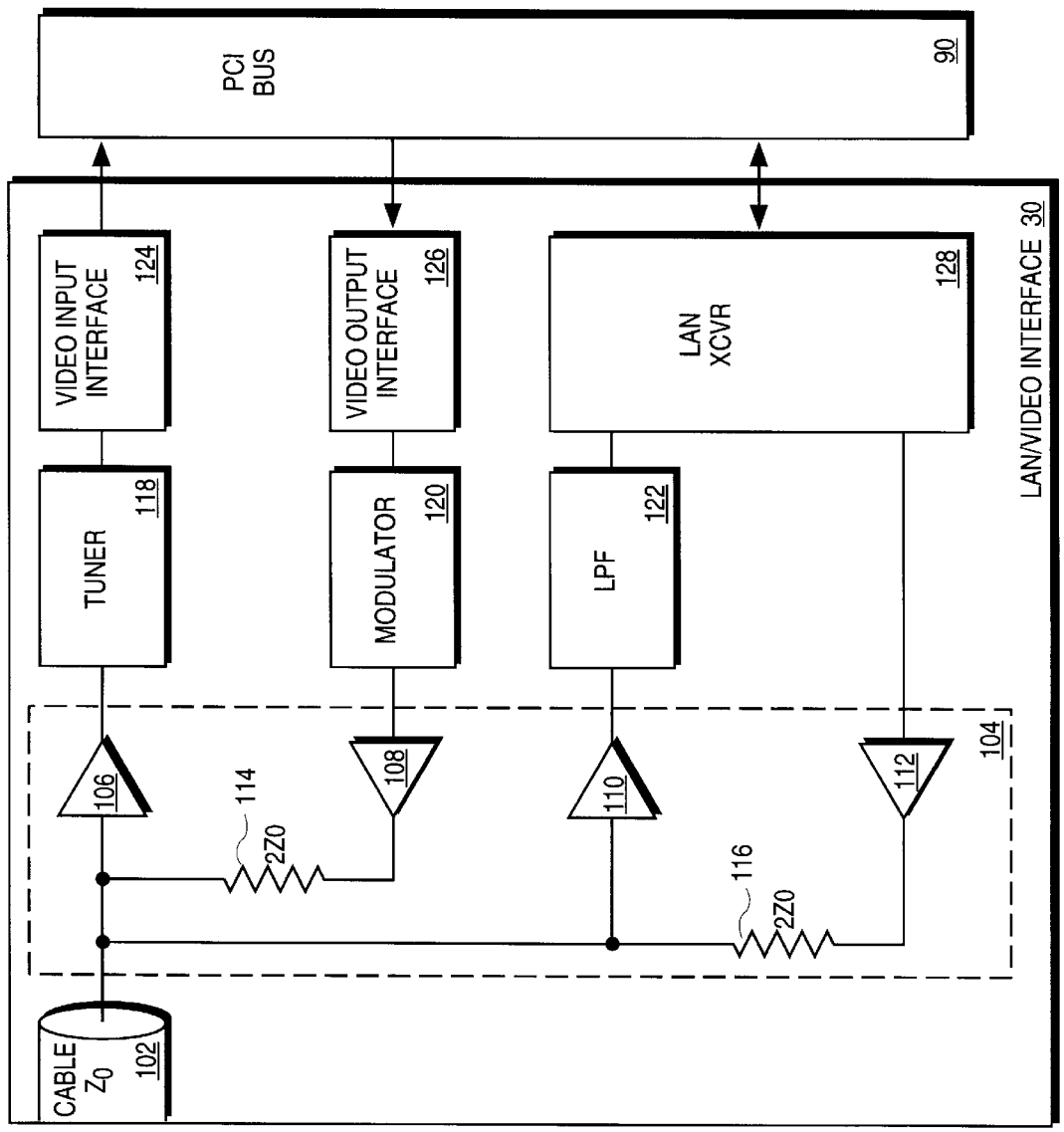
FIG. 7 illustrates a LAN/video interface for connecting a personal computer having video capabilities to a network according to the present invention via a PCI bus.

FIG. 7 illustrates the LAN/video interface 30 in detail. LAN/video interface 30 is designed to couple a PC having capability to generate composite video output to the network. Connection of the LAN/video interface 30 is made to the network by coaxial input/output connector 102. A hybrid circuit 104 provides impedance matching and termination. The hybrid circuit 104 includes resistors 114 and 116, each of which has a value of $2Z_o$, and buffer/amplifiers 106, 108, 110, and 112, each of which has essentially the same electrical characteristics as buffer/amplifier 46. Signals entering the coaxial input connector 102 are provided through a buffer amplifier 106 to a tuner 118. The tuner 118 provides tuning of cable television channels and video capture capabilities for local video transmitted on the upper cable television channels. Tuner 118 is coupled to the PCI bus 90 of PC16 through a video input interface 124. Video information on the PCI bus 90 that is to be output by the computer is provided through a video output interface 126 to a modulator 120. Modulator 120 is programmable by the CPU 82, such that video information can be modulated onto any of the eight local video channels SN 1 through SN 8. Modulated video output from the modulator 120 is provided to connector 102 through the series combination of buffer/amplifier 108 and resistor 114, where the video is then output to the rest of the network 1. Resistor 114 is coupled between the input of buffer/amplifier 106 and the output of buffer amplifier 108. A programmable LAN transceiver 128 allows PC 16 to function as an addressable LAN agent by providing bidirectional communication of baseband digital data. The LAN transceiver is bi-directionally coupled to the PCI bus 90. Connector 102 is coupled to an input of the LAN transceiver through the series combination of buffer/amplifier 110 and a low-pass filter 122. Low-pass filter 122 allows only frequencies from 0 to 50 MHz to pass, thereby isolating the LAN transceiver 128 from cable television and local video signals. An output of LAN transceiver 128 is coupled to connector 102 through the series combination of buffer/amplifier 112 and resistor 116.

Figure 8:
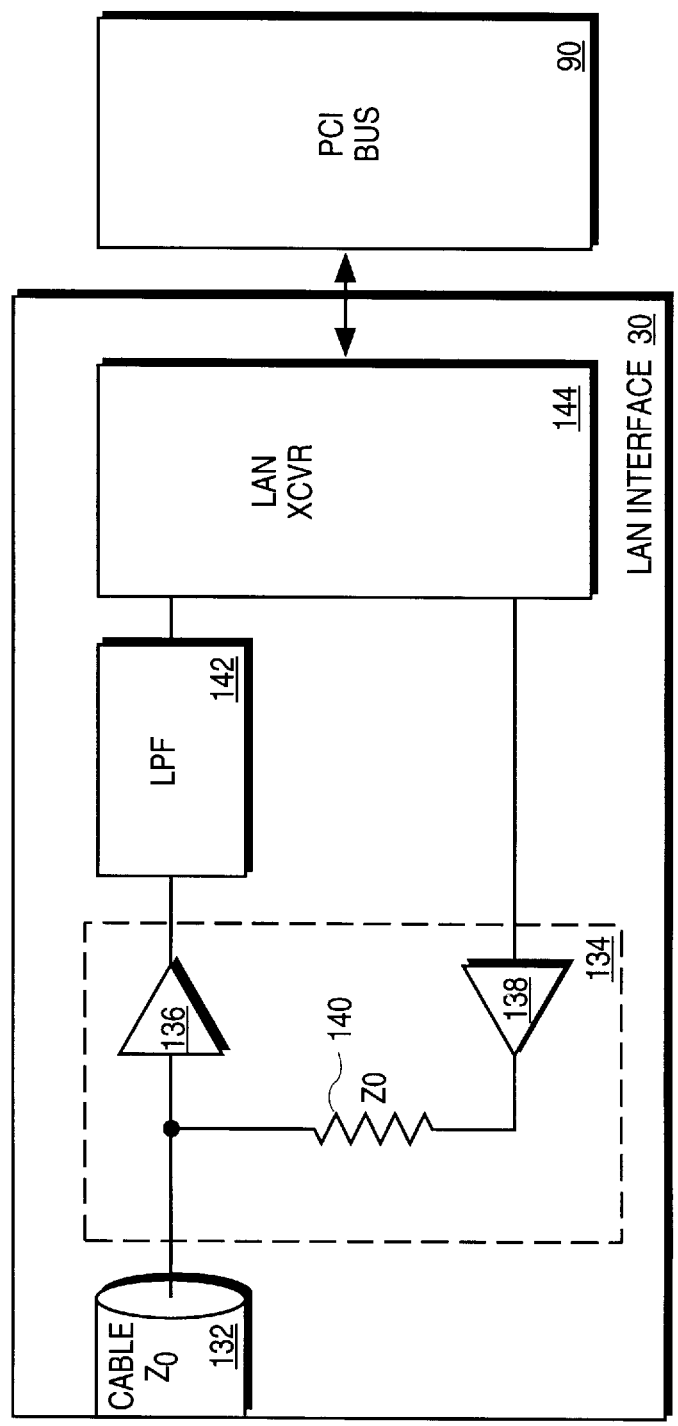
FIG. 8 illustrates a LAN interface for connecting a personal computer to a network according to the present invention via a PCI bus.

FIG. 8 illustrates the LAN interface 26. LAN interface 26 couples PC 14, which lacks composite video output capability, to the network 1. It should be appreciated that an interface identical to LAN/video interface 30 could easily be used in place of LAN interface 26; the video interface components in LAN/video interface 30 would simply be superfluous. LAN interface 26, therefore, provides a simpler, less-expensive alternative to LAN/video interface 30 for use with PCs that do not output composite video.

LAN interface 26 includes a coaxial input/output connector 132 for coupling the LAN interface 26 to the network 1. Coupled to coaxial connector 132 is hybrid circuit 134 comprising buffer/amplifiers 136 and 138 and resistor 140. Resistor 140 has a value of $Z_o$ to provide impedance matching and termination. Buffer/amplifiers 136 and 138 have essentially the same electrical characteristics as buffer/amplifier 46. A LAN transceiver 144 is bi-directionally coupled to the PCI bus 90.

Coaxial connector 132 is coupled to an input of LAN transceiver 144 through the series combination of buffer/amplifier 36 and low-pass filter 142. Low-pass filter 142 allows only frequencies from 0 to 50 MHz to pass, thereby isolating the LAN transceiver 144 from cable television and local video signals. An output of the LAN transceiver 144 is coupled to the coaxial connector 132 through the series combination of buffer amplifier 138 and resistor 140.

Figure 9A:
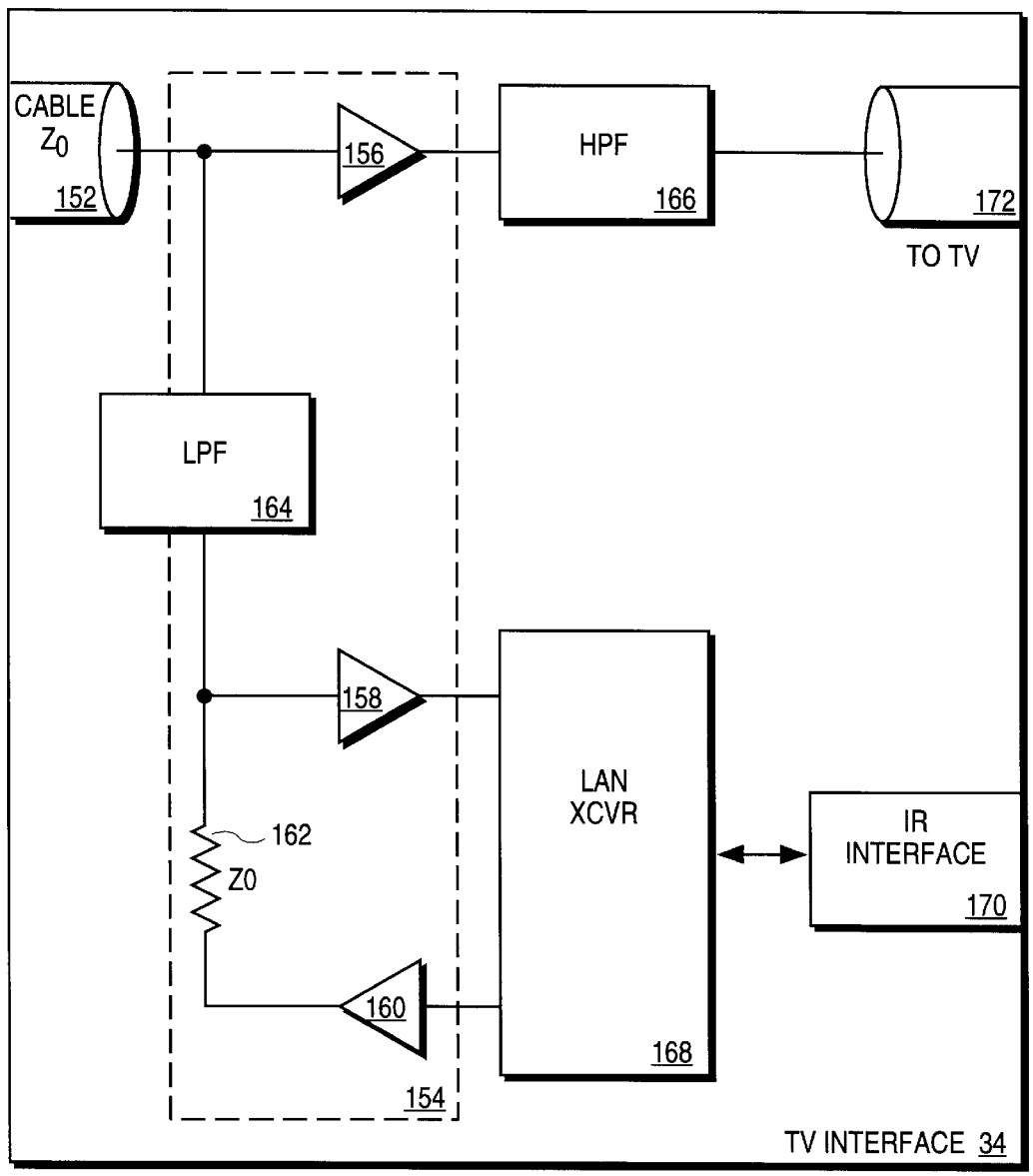
FIG. 9A illustrates a TV interface for connecting a television to a network according to the present invention.

FIG. 9A illustrates the TV interface 34, which couples television 18 to the network. A coaxial input/output connector 152 couples the TV interface 34 to the network, while coaxial output connector 172 provides an output for signals being transmitted to the television 18. A hybrid circuit 154 includes buffer/amplifiers 156, 158, and 160, a low-pass filter 164, and a resistor 162. Buffer/amplifiers 156, 158, and 160 have essentially the same electrical characteristics as buffer/amplifier 46. Resistor 162 has a value of $Z_o$ to provide impedance matching and termination. Coupled in series between input/output connector 152 and output connector 172 are buffer/amplifier 156 and a high-pass filter 166. The high pass filter 166 allows only frequencies above 50 MHz to pass, thereby isolating the television from the baseband digital information.

TV interface 34 also includes a programmable LAN transceiver 168 to allow the television 18 to function as an addressable LAN agent. Coupled in series between the input/output connector 152 and LAN transceiver 168 are a low-pass filter 164 and buffer/amplifier 158. Low-pass filter 164 allows only frequencies from 0 to 50 MHz to pass, thereby isolating the LAN transceiver 168 from cable television and local video signals. Coupled in series between an output of the LAN transceiver 168 and the input/output connector 152 are buffer/amplifier 160, resistor 162, and the low-pass filter 164. LAN transceiver 168 also has a bi-directional connection to an infrared sensor 170. The infrared sensor can receive infrared serial digital data from any of various computer peripheral components, such as wireless keyboards and game controllers. LAN transceiver 168 includes an embedded microcontroller (not shown) for converting the infrared serial data to data packets to be transmitted over the network 1.

Figure 9B:
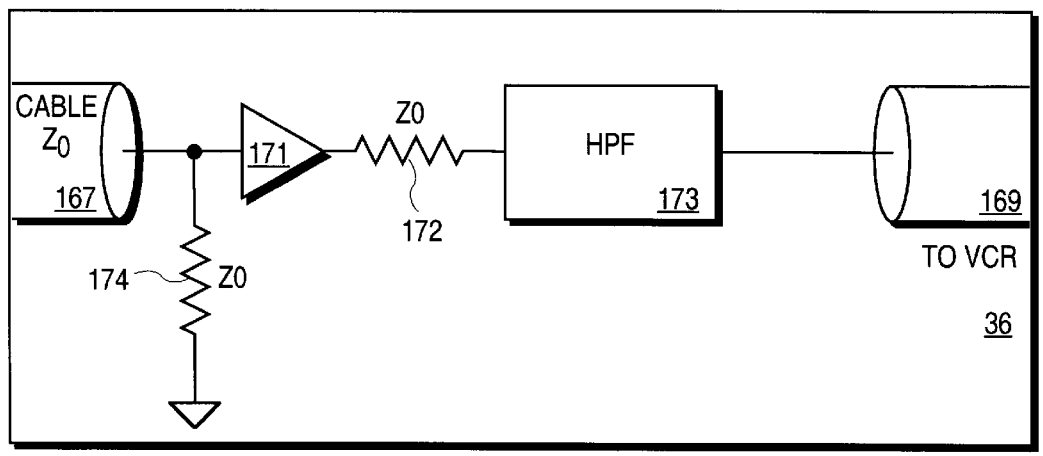
FIG. 9B illustrates the VCR interface 36 for coupling a VCR to a network according to the present invention.

FIG. 9B illustrates the VCR interface 36, which couples the VCR 22 to the network 1. The VCR interface 36 includes a coaxial input connector 167 and a coaxial output connector 169. Coupled between connectors 167 and 169 is the series combination of buffer/amplifier 171, resistor 172, and high-pass filter 173. Coupled between connector 167 and ground is resistor 174. Resistors 172 and 174 each have a resistance of $Z_o$. High-pass filter 173 allows only frequencies above 50 MHz to pass, thereby isolating the VCR 22 from the baseband digital information.

It should be appreciated that the TV interface 34 can be used to couple a VCR to the network 1 instead of the VCR interface 36. In that case, the infrared interface 170 and LAN transceiver 168 would provide a means for a PC on the network to program the VCR.

Figure 10:
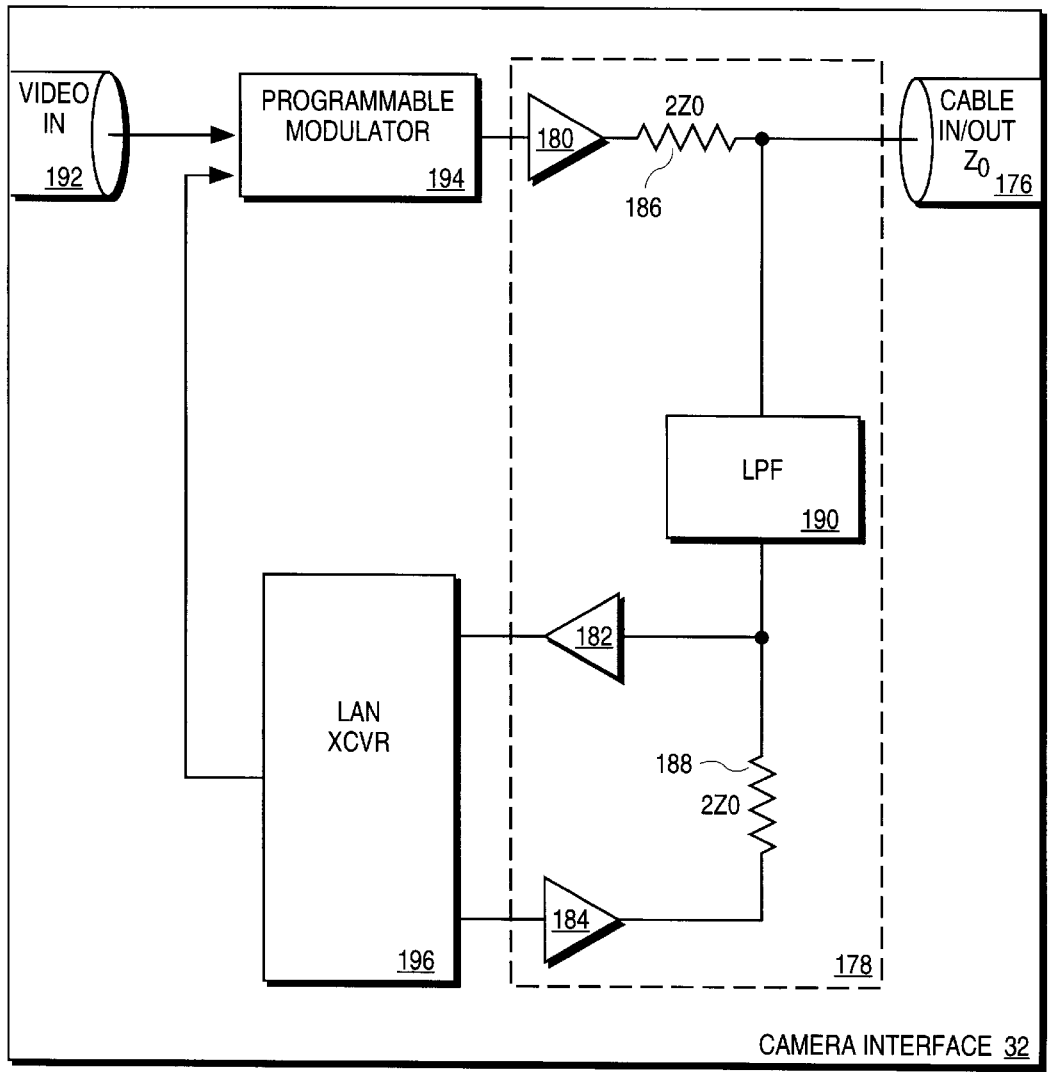
FIG. 10 illustrates a camera interface for connecting a camera to a network according to the present invention.

FIG. 10 illustrates the camera interface 32, which couples a video camera to the network. Camera interface 32 includes a hybrid circuit 178 comprising buffer/amplifiers 180, 182, 184, resistors 186 and 188, and low-pass filter 190. Buffer/amplifiers 156, 158, and 160 have essentially the same electrical characteristics as buffer/amplifier 46. Each of resistors 186 and 188 has a value $2Z_o$ to provide impedance matching and termination.

Camera interface 32 receives video from a video camera 24 through an input connector 192. Video input through connector 192 is then input to a programmable modulator 194, which modulates the video onto one of the eight local video channels, SN 1 through SN 8. Modulated local video output by programmable modulator 194 is coupled to coaxial input/output connector 176 through the series combination of buffer/amplifier 180 and resistor 186. A LAN transceiver 196 allows the camera to function as an addressable LAN agent. The programmable modulator 194 receives input for selecting a local video channel from LAN transceiver 196. The channel selection input from LAN transceiver 196 is based on baseband digital control signals transmitted by a PC over the network 1. The baseband digital signals are provided from connector 176 to an input of LAN transceiver 196 through the series combination of low-pass filter 190 and buffer/amplifier 182. An output of LAN transceiver 184 is coupled to connector 176 by the series combination of buffer/amplifier 184, resistor 188, and low-pass filter 190. Low-pass filter 190 allows only frequencies from 0 to 50 MHz to pass, thereby isolating the LAN transceiver 196 from cable television and local video signals.

Figure 11:
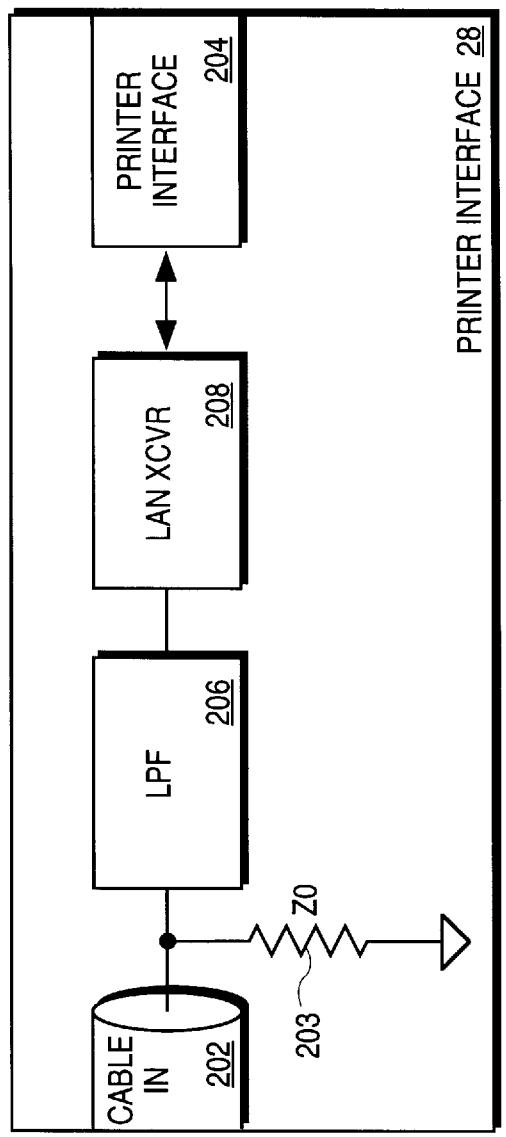
FIG. 11 illustrates a printer interface for connecting a printer to a network according to the present invention.

FIG. 11 illustrates the printer interface 28, which connects the printer 20 to the network 1. Connection to the network is provided through coaxial connector 202, while connection to the printer 20 is provided through printer interface 204. Connected in series between connector 202 and printer interface 204 are a low-pass filter 206 and a LAN transceiver 208. A resistor 203 having a value of $Z_o$ is coupled between connector 202 and ground for impedance matching and termination. LAN transceiver 208 allows the printer to function as an addressable LAN agent. Low-pass filter 206 allows only frequencies from 0 to 50 MHz to pass, thereby isolating the LAN transceiver 208 from cable television and local video signals.

Figure 12:
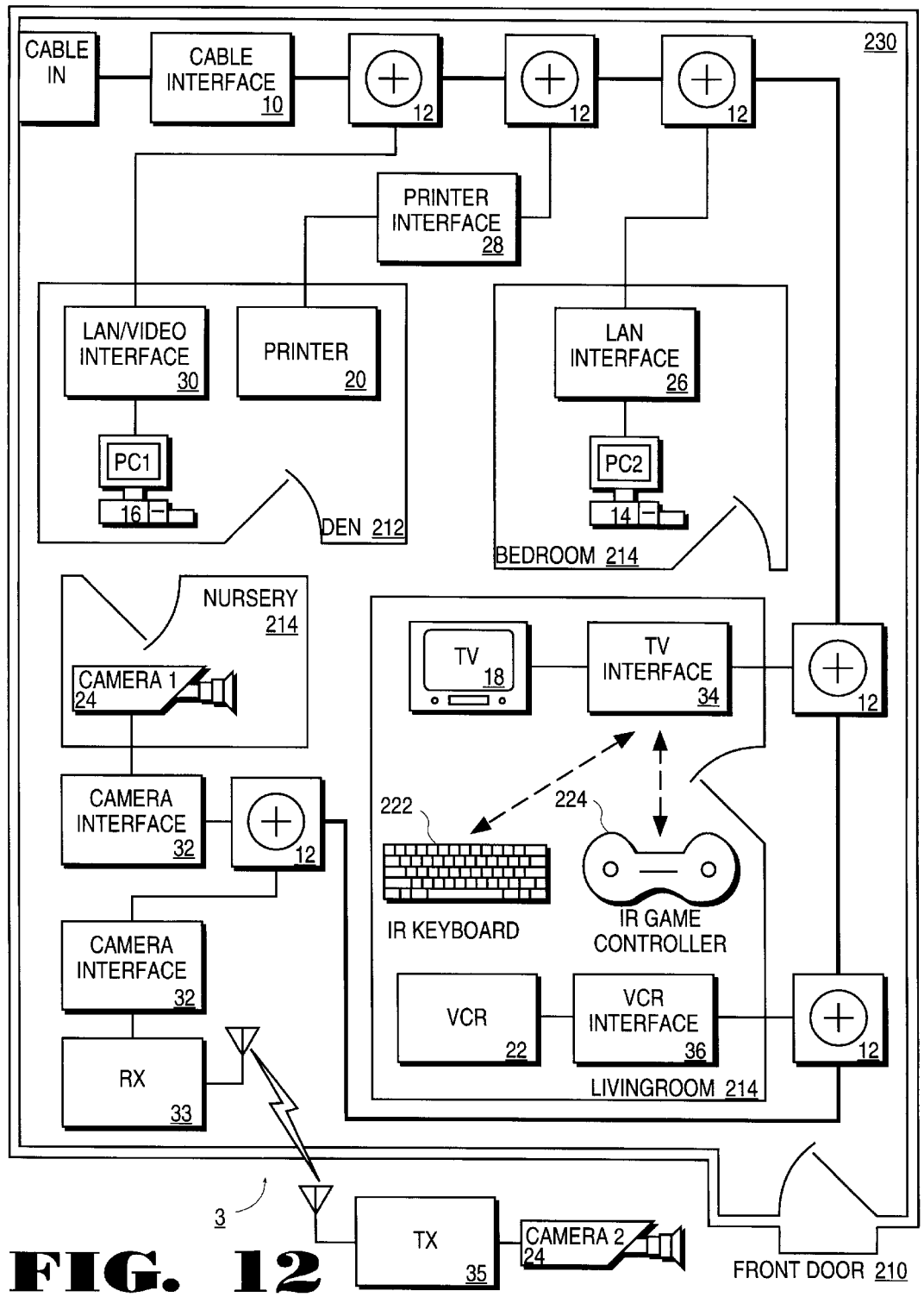
FIG. 12 illustrates one embodiment of a local area network according to the present invention in the context of a particular home environment.

A description will now be provided of how the present invention can be implemented advantageously in the context of a particular home. FIG. 12 shows a network 3 according to the present invention implemented in a home 230. A PC 16 having video output capability and a printer 220 are located in a den 212. A second PC 14 not having video output capability is located in a bedroom 214. A television 18 and VCR 22 are located in a living room 218. Two video cameras are provided, camera 24 in a nursery 216, and camera 37 outside the home 230 overlooking the front door 210.

The devices in the network 3 are generally connected in the manner described above using a number of RF taps 12. In particular, PCs 14 and 16, television 18, VCR 22, and cameras 24 and 37 are connected to the network by their respective interface devices. Each of the interface devices is coupled to an RF tap 12 by coaxial cable 15, and each RF tap 12 is coupled by coaxial cable 15 to at least one other RF tap 12. One RF tap 12 is connected to a cable interface 10, which is coupled to the home's cable television jack 8.

TV interface 34 can receive infrared input from either a wireless keyboard 222 or an infrared game controller 224. The network 3, in accordance with the present invention, permits use of the keyboard 218 and the game controller 224 as remote input devices for PCs 14 and 16 and use of the television 18 as a remote display device for PCs 14 and 16. In addition, television 18, PC 14, and PC 16 each can receive all cable television programs provided to the home 230. Further, both PC 14 and television 18 can receive and display local video output by PC 16, camera 24, or camera 37. PC 14 and PC 16 communicate with each other and with the printer 20 using baseband digital signals in the 0 to 50 MHz range.

Camera 24 is coupled directly to a camera interface 32. Camera 37 is coupled to a remote low-power wireless transmitter 35 located outside the home 230. Transmitter 35 transmits RF signals to a receiver 33 located inside the home 230. The receiver 33 is coupled to another camera interface 32.

The network 3 supports basic computer networking functions such as file and printer sharing. For example, files may be easily transferred between PCs 14 and 16 over the network. Further, PCs 14 and 16 each have full access to printer 20 over the network 3. Each device in the network is capable of receiving commands from either of PCs 14 and 16.

Suppose now that a first family member in the living room 218 is watching a televised sporting event on a cable television sports channel. However, this person is expecting an important announcement relating to the stock market to be made at any time on a news channel. Accordingly, this person has previously programmed PC 16 in the den 212 to monitor Closed-Caption television signals for a particular company name, such as "Intel", and to issue an alert when such company name is detected. PC 16 therefore monitors the Closed-Captioned video stream and, when the word "Intel" is detected, broadcasts an alert message over the digital network. The alert message causes an alert LED on TV interface 34 to become lit. Upon seeing the alert LED become lit, the person switches over to the news channel and listens to the announcement. The person then switches to local video channel SN 1 (cable channel 118) to view a stock table screen, which the person had previously set up PC 16 to generate. Having assimilated the information from the stock announcement and the stock table screen, the person then makes a prudent investment decision.

Suppose that in another scenario, a family member in the living room 218 requires certain information that is available on the World Wide Web. Having the wireless keyboard 222 in his or her lap, this person tunes to local video channel SN 2 (cable channel 119). In response to the person's input via the wireless keyboard 222, PC 16 launches a Web browser application designed to drive the PC's NTSC frame buffer. The NTSC video output by PC 16 is modulated onto channel SN 2, where it is received by the tuner in TV interface 34 and displayed on television 18. Signals from the wireless keyboard 22 are converted to packets at TV interface 34 and broadcast over the network, providing easy remote control of PC 16. The person in the living room 218 therefore is easily able to access a Web site through PC 16.

Suppose that in yet another scenario, a family member in the living room 218 hears the doorbell ring. Consequently, he or she switches the television 18 to local video channel SN 3 (cable channel 120) to view images of the front door 210 from camera 37 to see who is there. Similarly, the person may turn to local video channel SN 4 (cable channel 121) to view the baby in the nursery 216 through camera 24.

Hence, the present invention provides a network for PCs and televisions in the home environment using existing cable television cable infrastructure. The network supports file and printer sharing between PCs, permits a television to be used as a display device for any PC in the network, and permits any PC in the network to receive and display cable television programs provided to the home. Video generated by any PC or other video source in the network can be received by any other PC or television in the network. The network is expandable to support wireless RF transmitters and other peripheral devices.

Thus, an apparatus and method for providing interactive capabilities between televisions and PCs in a local area network has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A personal computer system comprising a processor, a memory, an interface device for coupling the personal computer system to a network capable of supporting baseband data and video, and first connection means for interconnecting the processor, the memory, and the interface device, the interface device including:

second connection means for coupling the interface device to the network;

filter means for separating the baseband data from the video;

tuner means for demodulating video received from the network, including television signals originating from outside the network and video generated within the network, the tuner means further for outputting the demodulated video to the first connection means, wherein the television signals are allocated to a plurality of television channels;

video output means for outputting local video to the network, wherein the video output means is programmable by the processor to assign the local video to any of a plurality of local video channels separate from the television channels; and transceiver means for outputting baseband data to the network and for receiving and providing to the first connection means baseband data received from the network.

2. A personal computer system according to claim 1, wherein the video includes display information generated by a second computer in the network.

3. A personal computer system according to claim 1, wherein the transceiver means is programmable to assign a network address to the personal computer system.

4. A personal computer system comprising a processor, a memory, an interface device for coupling the personal computer system to a network capable of supporting baseband data and video, and first connection means for interconnecting the processor, the memory, and the interface device, the interface device including:

second connection means for coupling the interface device to the network;

filter means for separating the baseband data from the video;

tuner means for demodulating video received from the network, including television signals originating from outside the network and video generated within the network, the tuner means further for outputting the demodulated video to the first connection means;

video output means for outputting local video to the network; and transceiver means for outputting baseband data to the network and for receiving and providing to the first connection means baseband data received from the network, wherein the transceiver means is programmable to assign a network address to the personal computer system.

5. A personal computer system according to claim 4, wherein the television signals are allocated to a plurality of television channels, and wherein the video output means is programmable by the processor to assign the local video to any of a plurality of local video channels separate from the television channels.

6. A personal computer system according to claim 4, wherein the video includes display information generated by a second computer in the network.

7. A computer system comprising:

a processor;

a memory;

an interface device for coupling the personal computer system to a network capable of supporting both baseband data and video;

a bus system interconnecting the processor, the memory, and the interface device, wherein the interface device includes:

a filter coupled to receive baseband data and video from the network, the filter for separating the received baseband data from the received video;

a tuner coupled to receive and demodulate the received video and coupled to output the demodulated video onto the bus system, the video including television signals originating from outside the network and video generated within the network, wherein the television signals occupy a plurality of television channels;

a video modulator coupled to output local video to the network, wherein the video modulator is programmable by the processor to assign the local video to any of a plurality of local video channels, the local video channels separate from the television channels; and a baseband transceiver coupled to output baseband data to the network, coupled to receive baseband data from the network, and coupled to output the baseband data received from the network onto the bus system.

8. A computer system according to claim 7, wherein the video includes display information generated by a second computer in the network.

9. A computer system according to claim 7, wherein the transceiver is programmable by the processor to assign a network address to the computer system.

10. A computer system comprising:

a processor;

a memory;

an interface device for coupling the personal computer system to a network capable of supporting both baseband data and video;

a bus system interconnecting the processor, the memory, and the interface device, wherein the interface device includes:

a filter coupled to receive baseband data and video from the network, the filter for separating the received baseband data from the received video;

a tuner coupled to receive and demodulate the received video and coupled to output the demodulated video onto the bus system, the video including television signals originating from outside the network and video generated within the network, wherein the television signals occupy a plurality of television channels;

a video modulator coupled to output local video to the network; and a baseband transceiver coupled to output baseband data to the network, coupled to receive baseband data from the network, and coupled to output the received baseband data onto the bus system, wherein the baseband transceiver is programmable by the processor to assign a network address to the computer system.

11. A computer system according to claim 10, wherein the video modulator is programmable by the processor to assign the local video to any of a plurality of local video channels, the local video channels separate from the television channels.

12. A personal computer system according to claim 10, wherein the video includes display information generated by a second computer in the network.

* * * * *